US012605660B2

(12) United States Patent
Nesland, Sr. et al.

(10) Patent No.: US 12,605,660 B2
(45) Date of Patent: *Apr. 21, 2026

(54) SYSTEM AND METHOD FOR FILTRATION OF INDUSTRIAL AND MOBILE FLUIDS

(71) Applicant: FluidLoop Technologies, LLC, Gig Harbor, WA (US)

(72) Inventors: Nickolas Bernheart Nesland, Sr., Gig Harbor, WA (US); Daniel Carney Griswold, Gig Harbor, WA (US)

(73) Assignee: FluidLoop Technologies, LLC, Gig Harbor, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/400,304

(22) Filed: Nov. 25, 2025

(65) Prior Publication Data

US 2026/0077284 A1 Mar. 19, 2026

Related U.S. Application Data

(63) Continuation of application No. 18/496,059, filed on Oct. 27, 2023, now Pat. No. 12,508,525.

(60) Provisional application No. 63/419,882, filed on Oct. 27, 2022.

(51) Int. Cl.
*B01D 37/04* (2006.01)
*B01D 35/26* (2006.01)

(52) U.S. Cl.
CPC ........... *B01D 37/043* (2013.01); *B01D 35/26* (2013.01); *B01D 37/041* (2013.01); *B01D 37/046* (2013.01)

(58) Field of Classification Search
CPC .... B01D 37/043; B01D 35/26; B01D 37/041; B01D 37/046
See application file for complete search history.

(56) References Cited

U.S. PATENT DOCUMENTS

| | | | |
|---|---|---|---|
| 3,759,388 | A | 9/1973 | Thomason |
| 5,417,851 | A | 5/1995 | Yee |
| 7,306,716 | B2 | 12/2007 | Baarman |
| 7,603,986 | B2 | 10/2009 | Ricco et al. |
| 7,993,530 | B2 | 8/2011 | Horne |
| 9,440,169 | B2 | 9/2016 | Shafer et al. |
| 9,724,631 | B2 | 8/2017 | Jakop |
| 9,957,940 | B2 | 5/2018 | Shafer et al. |
| 11,680,548 | B2 | 6/2023 | Tian et al. |

(Continued)

FOREIGN PATENT DOCUMENTS

WO WO1993001874 A1 2/1993

OTHER PUBLICATIONS

Oil Filtration Systems, Hand Held Filtration Systems, Jan. 19, 2022.

*Primary Examiner* — Terry K Cecil
(74) *Attorney, Agent, or Firm* — Forge IP, PLLC

(57) ABSTRACT

A filtration system includes a variable speed pump having a direct current motor in communication with a source of fluid to be filtered, and a filter assembly having in communication the variable speed pump and with the source of fluid, such that the source of fluid, the variable speed pump and the filter assembly define a kidney-loop filtration circuit in which the fluid is circulated and filtered. A control circuit in communication with the direct current motor varies a voltage supplied to the direct current motor such that the speed of the direct current motor is variable and consequently the flow of fluid through the variable speed pump and through the filter assembly is variable.

26 Claims, 4 Drawing Sheets

(56) References Cited

U.S. PATENT DOCUMENTS

| 2009/0087319 A1 | 4/2009 | Russold et al. |
| 2009/0283068 A1 | 11/2009 | Willison |
| 2016/0368781 A1 | 12/2016 | Mueller |
| 2023/0044784 A1 | 2/2023 | Hauser et al. |

SYSTEM AND METHOD FOR FILTRATION OF INDUSTRIAL AND MOBILE FLUIDS

FIELD OF THE INVENTION

The present invention generally relates to a system and method for filtering industrial and mobile fluids, such as hydraulic fluids, lubricating fluids and liquid fuels, and more specifically, to such a system and method employing a kidney-loop configuration that is readily scalable for use with different types of fluids, for use with fluids having different viscosities, and for use in applications involving different volumes of fluids.

BACKGROUND OF THE INVENTION

Many approaches exist for filtration of contaminants from industrial and mobile fluids, such as hydraulic fluids, lubrication fluids and liquid fuels. Most of these systems rely on a circulation system that pumps liquids from a storage reservoir around a fluid circuit through filtration and to equipment, and then back to a storage reservoir. In other cases, a portable cart with filters can be temporarily inserted into the circuit to filter the fluids. Such cart may have an onboard pumping system to direct fluid from storage through the filter and back to storage, or be used to transfer fluids from bulk containers to storage or equipment tanks. These are often referred to as kidney loop filtration systems and generally use high capacity pumps to circulate 3-8 gpm of fluid through the filter(s).

Various problems exist with respect to these types of systems, however. One significant problem is that the entire filtration system, and in particular the pump, generally must be specifically designed for each particular application in which the system is intended to be used. This is true because multiple factors may affect performance of the filtration system overall, and of the pump in particular. For example, the type of fluid to be filtered generally dictates appropriate types of filters, which, in turn, may affect optimal flow rates through the system (e.g., different types of filters may operate most efficiently within a specified flow rate window), the viscosity of the fluid may affect flow characteristics of the pump (e.g., more viscous fluids may require higher pump speed/power), the size of the fluid reservoir may affect optimal flow rates (e.g., if a particular number of volume turnovers per period of time is desired), etc. Thus, it would be highly desirable for the system to be readily scalable for use with different types of fluids, for use with fluids having different viscosities, and for use in applications involving different volumes of fluids.

At the same time, it would be desirable to employ the smallest configuration possible, and in particular the smallest pump possible, while still achieving the desired results. This allows for the minimization of cost and size/weight, such that the portability of the system is improved.

In particular, it is highly desirable for a system to be readily moveable from one piece of equipment to another, and then for any necessary adjustments to be made to system settings, such the system can be put in service quickly and easily as it is moved from one piece of equipment to another.

SUMMARY OF THE INVENTION

These and other objectives and considerations are achieved, in accordance with a first aspect of the invention, by providing a filtration system comprising a variable speed pump having a direct current motor and comprising an input adapted to communicate with a source of fluid to be filtered, and a filter assembly having an input in communication with an output of the variable speed pump and an output in communication with the source of fluid. The source of fluid, the variable speed pump and the filter assembly define a kidney-loop filtration circuit in which the fluid is circulated and filtered. A control circuit in communication with the direct current motor of the variable speed pump varies a voltage supplied to the direct current motor such that the speed of the direct current motor is variable and consequently the flow of fluid through the variable speed pump and through the filter assembly is variable between 0.05 gpm and 0.45 gpm. The direct current motor draws current and produces an output of less than 0.10 hp.

In some embodiments, the direct current motor comprises a brushless motor and the variable speed pump is magnetically driven by the direct current motor, whereby no driveshaft or transmission is employed.

In some embodiments, the fluid to be filtered is an industrial or mobile fluid comprising at least one of a hydraulic fluid, a lubricating fluid and a liquid fuel. In some embodiments, the filter assembly reduces at least one of particle contamination and water from the fluid to be filtered.

In some embodiments, the control circuit comprises a potentiometer manually actuable by an operator to vary the voltage supplied to the direct current motor. In other embodiments, the control circuit comprises at least one sensor configured to measure at least one of a flow rate through the filtration circuit, a level of contamination within the filtration circuit and a pressure within the filtration circuit and a processor in communication with the at least one sensor, the processor configured to vary the voltage supplied to the direct current motor at least in part based upon a value measured by the at least one sensor.

In some embodiments, the filtration system further comprises a filter head on which the variable speed pump is mounted, the filter head having an inlet port in communication with the variable speed pump, a filter connection adapted to receive the filter assembly and an outlet port in communication with the source of fluid. In certain of these embodiments, the filter assembly comprises a spin-on filter having a threaded connection adapted to engage the filter connection of the filter head. In certain embodiments, the filtration system further comprises at least one threaded adaptor disposed between the threaded connection of the spin-on filter and the filter connection of the filter head. In some of these embodiments, the at least one threaded adaptor comprises a plurality of threaded adaptors having different configurations as compared to one another, whereby an appropriate one of the plurality of threaded adaptors is selectable depending upon a configuration of the threaded connection of the spin-on filter such that a plurality of spin-on filters having different configurations as compared to one another are compatible with the filter head.

In some embodiments, the filtration system further comprises a pressure gauge displaying a pressure of the fluid within the filtration circuit. In some embodiments, the filtration system further comprises a sample spigot by which a sample of the fluid within the filtration circuit can be withdrawn.

In some embodiments, the filtration system further comprises a detachable mounting bracket by which the filtration system is mountable to a surface. In some embodiments, the filtration system further comprises a detachable stand by which by which the filtration system is supported on a surface.

In some embodiments, the direct current motor is equipped with at least one of the following: over speed protection, under speed protection, stall protection and thermal protection. In some embodiments, the variable speed pump has an adjustable pressure relief threshold, and wherein, if the pressure relief threshold is exceeded, a portion of the fluid to be filtered recirculates back through the variable speed pump to avoid over-pressurization of the filtration circuit.

In accordance with another aspect of the present invention, a filtration system comprises a variable speed pump having a direct current motor and an input adapted to communicate with a source of fluid to be filtered, wherein the direct current motor comprises a brushless motor and wherein the variable speed pump is magnetically driven by the direct current motor, whereby no driveshaft or transmission is employed. A filter assembly has an input in communication with an output of the variable speed pump and an output in communication with the source of fluid, such that the source of fluid, the variable speed pump and the filter assembly define a kidney-loop filtration circuit in which the fluid is circulated and filtered. The fluid to be filtered is an industrial or mobile fluid comprising at least one of a hydraulic fluid, a lubricating fluid and a liquid fuel, and the filter assembly reduces at least one of particle contamination and water from the fluid to be filtered. A filter head is provided on which the variable speed pump is mounted, the filter head having an inlet port in communication with the variable speed pump, a filter connection adapted to receive the filter assembly and an outlet port in communication with the source of fluid. The filter assembly comprises a spin-on filter having a threaded connection adapted to engage the filter connection, and at least one threaded adaptor is disposed between the threaded connection of the spin-on filter and the filter connection of the filter head. A control circuit is in communication with the direct current motor of the variable speed pump, the control circuit varying a voltage supplied to the direct current motor such that the speed of the direct current motor is variable and consequently the flow of fluid through the variable speed pump and through the filter assembly is variable between 0.05 gpm and 0.45 gpm. The direct current motor draws current and produces an output of less than 0.10 hp.

In some embodiments, the control circuit comprises a potentiometer manually actuable by an operator to vary the voltage supplied to the direct current motor. In other embodiments, the control circuit comprises at least one sensor configured to measure at least one of a flow rate through the filtration circuit, a level of contamination within the filtration circuit and a pressure within the filtration circuit, and a processor in communication with the at least one sensor, the processor configured to vary the voltage supplied to the direct current motor at least in part based upon a value measured by the at least one sensor.

In some embodiments, the at least one threaded adaptor comprises a plurality of threaded adaptors having different configurations as compared to one another, whereby an appropriate one of the plurality of threaded adaptors is selectable depending upon a configuration of the threaded connection of the spin-on filter such that a plurality of spin-on filters having different configurations as compared to one another are compatible with the filter head.

In some embodiments, the filtration system further comprises a pressure gauge displaying a pressure of the fluid within the filtration circuit. In some embodiments, the filtration system further comprises a sample spigot by which a sample of the fluid within the filtration circuit can be withdrawn.

In some embodiments, the filtration system further comprises a detachable mounting bracket by which the filtration system is mountable to a surface. In some embodiments, the filtration system further comprises a detachable stand by which by which the filtration system is supported on a surface.

In some embodiments, the direct current motor is equipped with at least one of the following: over speed protection, under speed protection, stall protection and thermal protection. In some embodiments, the variable speed pump has an adjustable pressure relief threshold, and wherein, if the pressure relief threshold is exceeded, a portion of the fluid to be filtered recirculates back through the variable speed pump to avoid over-pressurization of the filtration circuit.

Other objects of the invention and its particular features and advantages will become more apparent from consideration of the following drawings and accompanying detailed description.

DETAILED DESCRIPTION OF THE INVENTION

Generally, the present invention provides a kidney-loop filtration system that is readily scalable for use with different types of fluids, for use with fluids having different viscosities, and for use in applications involving different volumes of fluids. Exemplary embodiments of the present invention will now be described with reference to the drawings.

Figure 1:
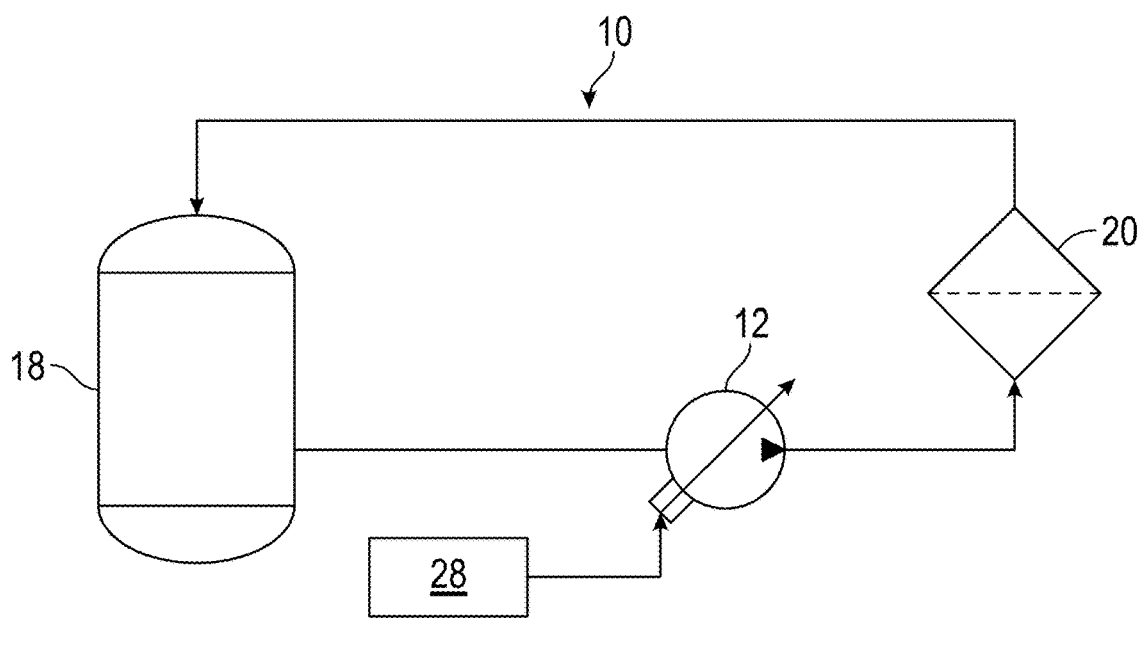
FIG. 1 is a schematic view of an exemplary filtration system in accordance with the present invention shown in its operating environment.
Figure 2:
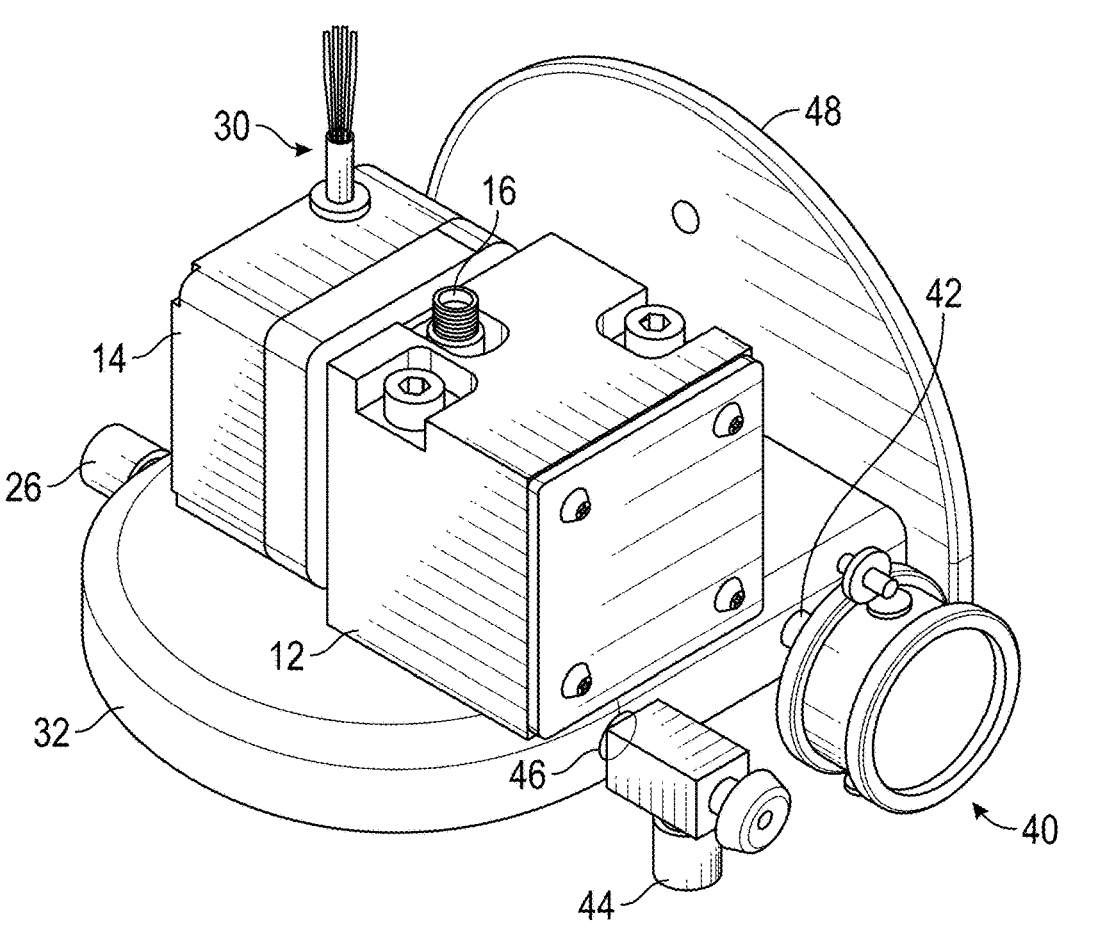
FIG. 2 is a side isometric view of the exemplary filtration system of FIG. 1 shown with an optional mounting bracket.
Figure 4:
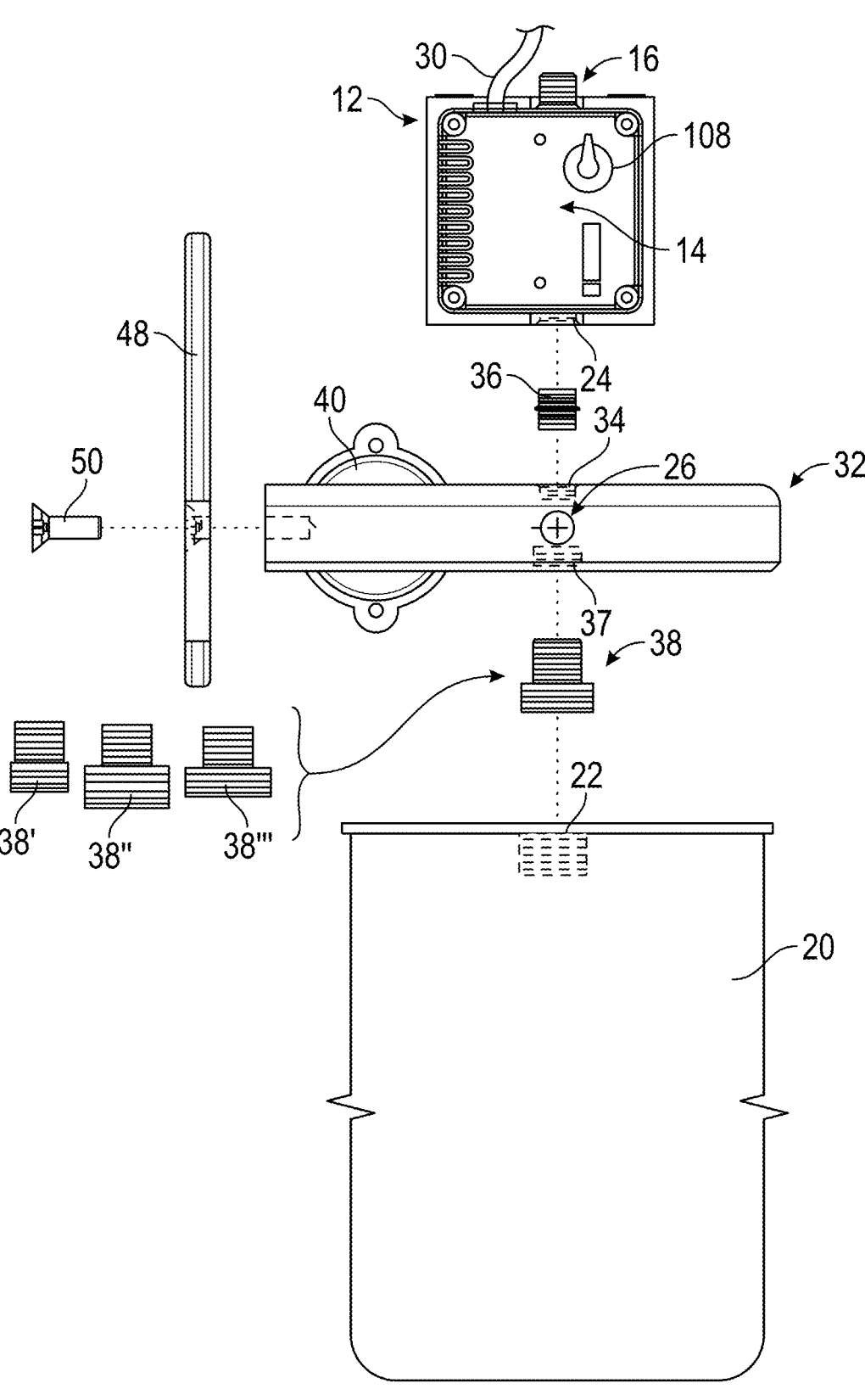
FIG. 4 is a side exploded view of portions of the exemplary filtration system of FIG. 1 shown with an optional mounting bracket as well as a variety of threaded adaptors.

Referring first to FIGS. 1, 2 and 4, a filtration system (10) generally comprises a variable speed pump (12) having a direct current motor (14) and comprising an input (16) adapted to communicate with a source (18) of fluid to be filtered, and a filter assembly (20) having an input (22) in communication with an output (24) of the variable speed pump (12) and an output (26) in communication with the source (18) of fluid. The source (18) of fluid, the variable speed pump (12) and the filter assembly (20) define a kidney-loop filtration circuit in which the fluid is circulated and filtered, as best seen in FIG. 1.

A control circuit (28) in communication with the direct current motor (14) of the variable speed pump (12), varies a voltage supplied to the direct current motor (14) from a voltage source (30) such that the speed of the direct current motor (14) is variable and consequently the flow of fluid through the variable speed pump (12) and through the filter assembly is variable between 0.05 gpm and 0.45 gpm. The direct current motor (14) draws current and produces an output of less than 0.10 hp.

The direct current motor (14) may generally comprise a brushless motor and the variable speed pump (12) is magnetically driven by the direct current motor (14), whereby no driveshaft or transmission is employed. As a more specific example, the pump/motor combination (12,14) may comprise a 24V brushless DC drive motor with integrated pump and variable speed control-which may be married to a low voltage potentiometer and resistor in certain embodiments. The potentiometer is manually used to control the pump speed depending on type of oil/viscosity used, volume of the reservoir or sump, and type of filter desired. The fact that pump (12) is magnetically driven by the motor (14) eliminates a drive shaft and seal, and thus reduces the potential for leakage.

The speed of the motor (14) is controlled by an analog voltage control input (ranging from 0V-5V) produced by the control circuit (28). The input signal may be manually controlled, for example by a potentiometer that is manually actuable by an operator to vary the control input voltage supplied to the direct current motor (i.e., between 0V-5V). The magnitude of the analog voltage controls the speed of the motor and thus the fluid flow rate. Thereby, manual flow control to the pump/motor can be a simple potentiometer (rheostat) operated by the user to control the voltage to the variable speed pump.

Figure 5A:
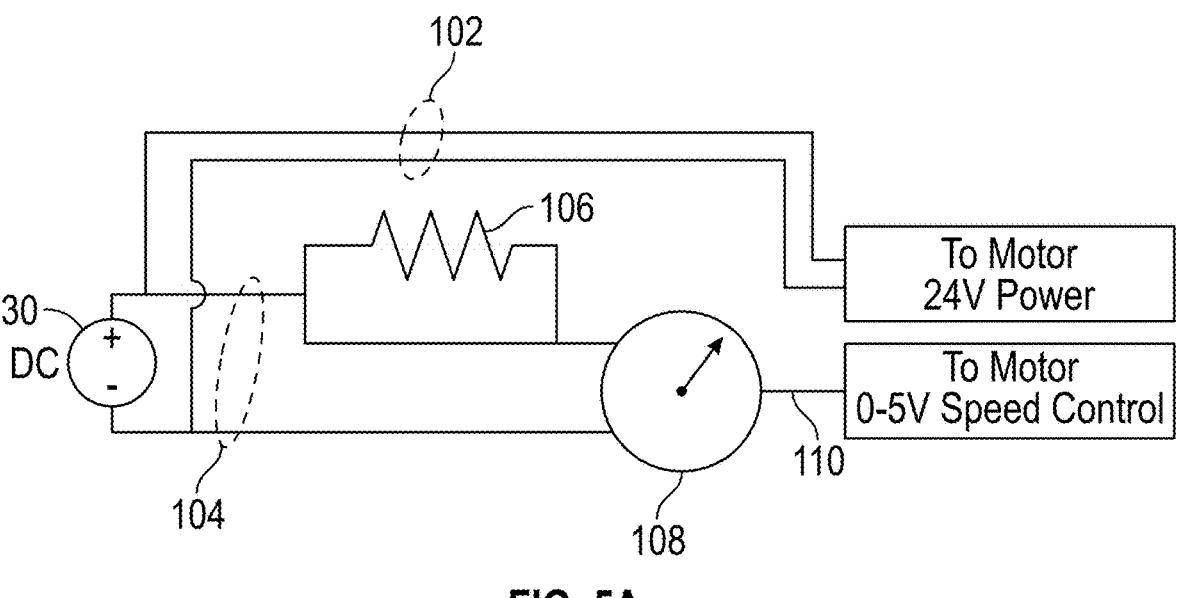
FIG. 5A is a schematic view showing a control circuit aspect of the exemplary filtration system of FIG. 1 taking the form of a potentiometer configured for manual speed control.

Referring now to FIG. 5A, an exemplary manual control circuit is illustrated. As shown, a 24V DC power supply (30) is provided. Connected thereto via a drive circuit (102) is motor (14), such that motor (14) received the full 24V of power via the drive circuit (102). Connected in parallel with the drive circuit (102) is an input signal circuit (104) which comprises a resistor (106) sized to ensure a maximum voltage through input signal circuit (104) of 5V, along with the potentiometer (108) manually actuable by an operator to pass a speed control signal (110) to the motor (14) ranging from 0V to the full 5V available through the input signal circuit (104).

Figure 5B:
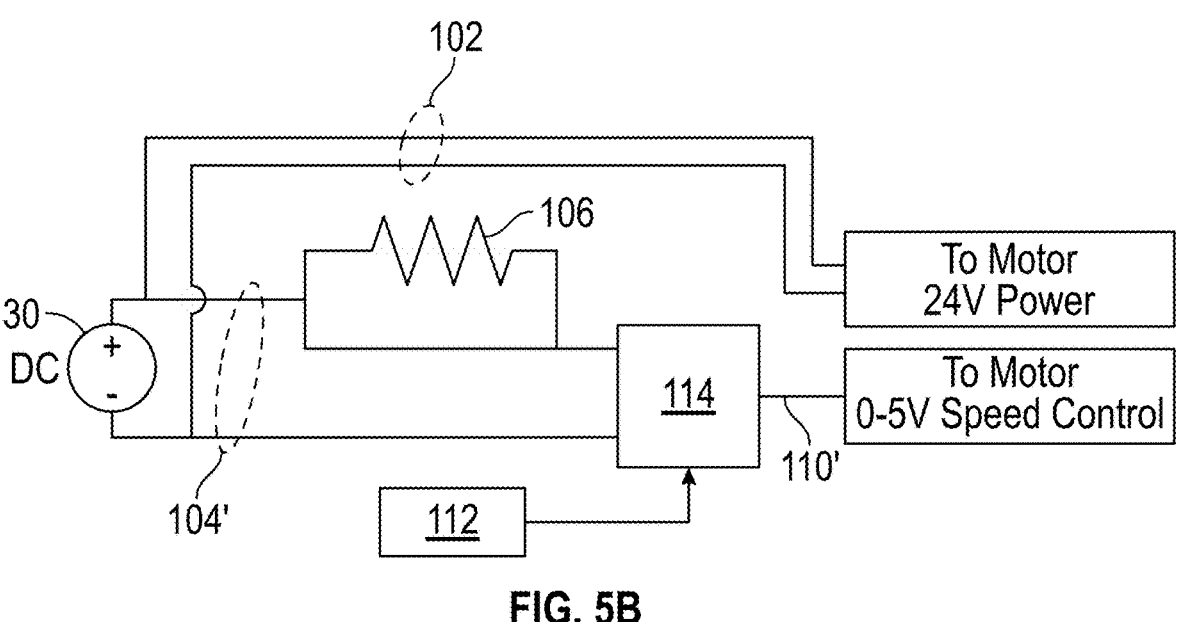
FIG. 5B is a schematic view showing a control circuit aspect of the exemplary filtration system of FIG. 1 taking the form of a sensor and a processor configured for automatic speed control.

On the other hand, and with reference now to FIG. 5B, the control circuit (28) can be automated instead of being, or in addition to being, manually operated. In similar fashion to the manual control embodiment, a 24V DC power supply (30) is provided. Connected thereto via a drive circuit (102) is motor (14), such that motor (14) received the full 24V of power via the drive circuit (102). Connected in parallel with the drive circuit (102) is an input signal circuit (104') which comprises a resistor (106) sized to ensure a maximum voltage through input signal circuit (104') of 5V. However, instead of a potentiometer, the automated control circuit shown in FIG. 5B comprises at least one sensor (112) configured to measure at least one of a flow rate through the filtration circuit, a level of contamination within the filtration circuit and a pressure within the filtration circuit and a processor (114) in communication with the at least one sensor (112). The processor is configured to pass a speed control signal (110') to the motor (14) ranging from 0V to the full 5V available through the input signal circuit (104') at least in part based upon a value measured by the at least one sensor (112).

The motor (14) is preferably also equipped with at least one of the following: over speed protection, under speed protection, stall protection and thermal protection. Additionally, the pump (12) preferably has an adjustable pressure relief threshold, such that if the pressure relief threshold is exceeded, a portion of the fluid to be filtered recirculates back through the pump (12) to avoid over-pressurization of the filtration circuit.

Referring again to FIGS. 1, 2 and 4, the variable speed pump (12), including the motor (14), is mounted on a filter head (32), having an inlet port (34) in communication with the output (24) of the variable speed pump (12), for example, via a threaded coupling member (36). The filter head (32) also includes as part thereof the outlet port (26) in communication with the source (18) of fluid.

Additionally, the filter head (32) includes a filter connection (37) adapted to receive the filter assembly (20). As shown in FIG. 1, the filter assembly (20) may comprise a spin-on filter having a threaded connection defining the input (22) thereof adapted to engage the filter connection (37) of the filter head (32). At least one threaded adaptor (38) may be disposed between the threaded connection defining the input (22) of the spin-on filter (20) and the filter connection (37) of the filter head (32). However, it is preferable that a plurality of threaded adaptors (38, 38', 38'', 38''') having different configurations as compared to one another be provided. This allows for an appropriate one of the plurality of threaded adaptors (38, 38', 38'', 38''') to be selectable depending upon a configuration of the threaded connection defining the input (22) of the spin-on filter (20) such that a plurality of spin-on filters having different configurations as compared to one another are compatible with the filter head (32).

A pressure gauge (40) displaying a pressure of the fluid within the filtration circuit may be provided. Specifically, the pressure gauge (40) may be connected to a corresponding port (42) provided in the filter head (32). Additionally, a sample spigot (44) is provided by which a sample of the fluid within the filtration circuit can be withdrawn. The sample spigot (44) may be connected to another corresponding port (46) provided in the filter head (32).

Figure 3:
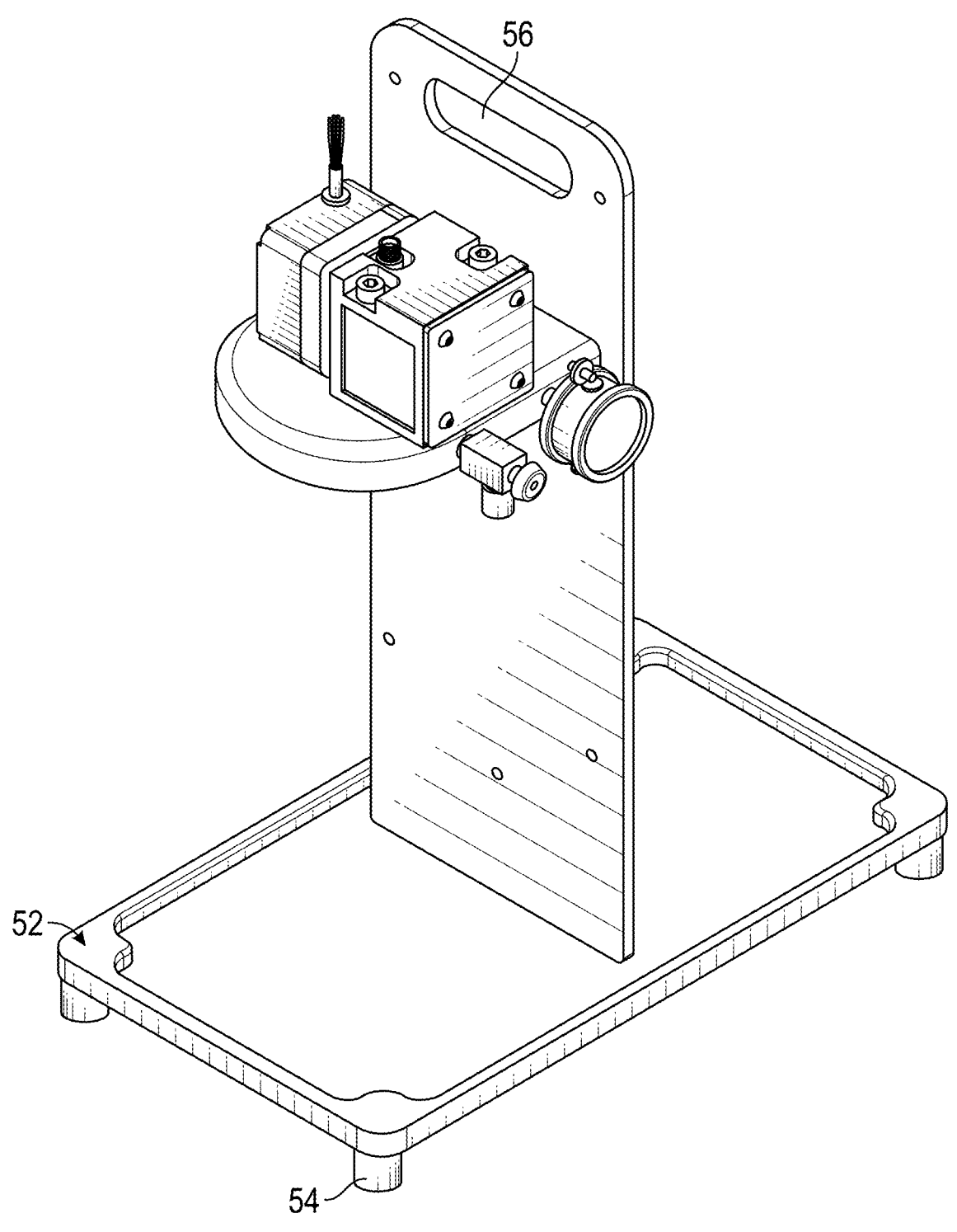
FIG. 3 is a side isometric view of the exemplary filtration system of FIG. 1 shown with an optional stand.

As best seen in FIGS. 2 and 4, the filtration system (10) may further include a mounting bracket (48) by which the filtration system (10) is mountable to a surface, such as a wall or some other vertical surface (not shown). The mounting bracket (48) if preferably detachably connected to the filter head (32) by a threaded fastener (50) or the like, such that the mounting bracket (48) may be completely removed, or may be replaced with, for example, a detachable stand (52), as shown in FIG. 3, by which by which the filtration system (10) may be supported on a generally horizontal surface (not shown). The stand (52) may include feet (54) or the like, which preferably isolates any vibrations caused by the pump (12), and/or may include an opening (56) therein defining a handle or the like in order to facilitate portability of the filtration system (10).

The present invention provides multiple benefits as compared to known filtration systems. In contrast to variable frequency drive (VFD) pumps found in the art that control motor speed by varying the frequency of the electric supply to the motor, the present invention provides a simpler, less expensive and more versatile configuration.

Moreover, the present invention eliminates the need to change pump sizes depending on the application, whereas many known kidney-loop systems require "sizing" of the pump to the application. In this regard, fixed speed pumps typically come in multiple sizes (as many as 10 different pumps) that may need to be evaluated by an experienced technician in order to target the correct fluid flow for the application. This obviously leads to increased expense.

Other known systems that are able to vary the flow rate use variable frequency drive (VFD) pumps, piston pumps or control valves, which are expensive and relatively complicated, thereby providing an increased chance of failure.

The present invention also provides enhanced versatility as compared to previously known options. The present invention may be readily moved from one application to the next, relying on the control circuit (e.g., potentiometer) to vary the control voltage to the variable speed pump motor, thereby allowing flow rate adjustment to suit the application. Additionally, the provision of a plurality of filter connection adaptors allows for many different sizes and types of filters to be employed, thereby readily allowing for different types and volumes of fluids to be filtered. For example, the fluid to be filtered may be any of various types of industrial or mobile fluids, such as hydraulic fluids, lubricating fluids, liquid fuels, etc. Moreover, the filter assemblies may be readily changed even if they have different filter connections and/or operate at different optimum flow rates due at least in part to the connection adaptors and/or the variable speed control. For example, filter assemblies that reduce at least one of particle contamination and water from the fluid to be filtered may be employed.

Further, the relatively small size of the pump/motor of the present invention, as well as its integration with a filter head plate, allow for enhanced portability. Specifically, the pump/motor of the illustrated example of the present invention measures approximately 2"×2"×4", which allows it to be mounted to a 5" filter head plate. Prior art systems are significantly larger, heavier and most require a wheeled cart or the like for portability.

As discussed above, the pump of the present invention allows for manual adjustment to a backpressure setting that recirculates flow to the pump to avoid overpressure. The pump of the present invention also has a relief valve that allows pressure to be adjusted to keep from overloading the pump & motor. In addition to a pressure relief setting, there are additional protection features in the pump/motor configuration, including under voltage protection (i.e., the motor has an internal under voltage protection set at 15.5 V, such that when this limit is reached, the motor is automatically stopped), over voltage protection (i.e., the motor has an internal over voltage protection set at 30 V, such that when this limit is reached the motor is automatically stopped), motor stall protection (i.e., the motor is automatically stopped if it is not able to rotate for 1 second) and thermal protection (i.e., the motor has an internal thermal protection built in the drive board, such that the thermal upper limit is 120° C./248° F. and when this value is reached the motor is automatically stopped).

Below are examples of filtration systems configured in accordance with embodiments of the present invention being used in practice.

Example 1

On a small reservoir of synthetic gear oil, the kidney loop filtration system is installed with a 4-micron synthetic filter. For this fluid, the pump speed is manually set at 50% and produces a flow rate of 0.34 gpm, or roughly 20 gph. Thus, on a five-gallon reservoir, the system would provide four "tank-turns" per hour whether the piece of industrial equipment was operating or not.

Transferring the same kidney loop filtration system to a separate 5-gallon reservoir of Hydraulic Oil-AW 46; with a clean 4-micron synthetic filter, the pump speed is manually set at 68% to produce a similar flow rate of 0.34 gpm, or roughly 20 gph.

Thus, in contrast to systems with fixed pump speeds, the use of the variable speed pump/motor arrangement in accordance with the present invention allows this kidney loop filtration system to be easily moved from one piece of equipment to another even when operating on different industrial or mobile fluids.

Example 2

On an industrial piece of equipment used in log peeling, an actuator assembly cycles approximately 8,000 times per day when operating.

A kidney loop filtration system was installed to treat the approximately 3 gallons of gear oil in the unit and to reduce the frequency of rebuilds due to contamination in the gear oil. The filtration system was installed with a one-micron depth filter and the pump speed was set using the manual potentiometer to approximately 50% speed. The resultant flow was 0.075 gpm or roughly 4.5 gph. This resulted in approximately 1.5 tank turns per hour. The filtration system was operated continuously both during machine operation and during down time.

Prior to installing the filtration system, the ISO particle counts for 4-micron, 6 micron and 14-micron particles were: 25-25-24. After one week of operation with the filtration system, the ISO counts were reduced to 23-20-15; and after 5-weeks they were further reduced to 18-16-12. This demonstrates the benefit of the small, low power consumption filtration system installed on small industrial or mobile fluid-based systems that would not normally have filtration systems on the equipment. The result is longer service life for equipment and reduced need for synthetic or hydrocarbon replacement fluids.

The present invention thus provides a kidney-loop filtration system that is readily scalable for use with different types of fluids, for use with fluids having different viscosities, and for use in applications involving different volumes of fluids.

What is claimed is:

1. A filtration system comprising:
    a variable speed pump having a direct current motor and comprising an input adapted to communicate with a source of fluid to be filtered;
    a filter assembly having an input in communication with an output of said variable speed pump and an output in communication with the source of fluid;
    wherein the source of fluid, said variable speed pump and said filter assembly define a kidney-loop filtration circuit in which the fluid is circulated and filtered; and
    a control circuit in communication with a direct current power supply and with the direct current motor of said variable speed pump, said control circuit varying a voltage received from the direct current power supply and supplying the varied voltage to the direct current motor such that the speed of the direct current motor is variable and consequently the flow of fluid through said variable speed pump and through said filter assembly is variable.

2. The filtration system of claim 1 wherein the direct current motor comprises a brushless motor and wherein said variable speed pump is magnetically driven by the direct current motor, whereby no driveshaft or transmission is employed.

3. The filtration system of claim 1 wherein the fluid to be filtered is an industrial or mobile fluid comprising at least one of a hydraulic fluid, a lubricating fluid and a liquid fuel.

4. The filtration system of claim 1 wherein said filter assembly reduces at least one of particle contamination and water from the fluid to be filtered.

5. The filtration system of claim 1 wherein said control circuit comprises a potentiometer manually actuable by an operator to vary the voltage supplied to the direct current motor.

6. The filtration system of claim 1 wherein said control circuit comprises:

at least one sensor configured to measure at least one of a flow rate through the filtration circuit, a level of contamination within the filtration circuit and a pressure within the filtration circuit; and a processor in communication with said at least one sensor, said processor configured to vary the voltage supplied to the direct current motor at least in part based upon a value measured by said at least one sensor.

7. The filtration system of claim 1 further comprising a filter head on which said variable speed pump is mounted, said filter head having an inlet port in communication with said variable speed pump, a filter connection adapted to receive said filter assembly and an outlet port in communication with the source of fluid.

8. The filtration system of claim 7 wherein said filter assembly comprises a spin-on filter having a threaded connection adapted to engage the filter connection of said filter head.

9. The filtration system of claim 8 further comprising at least one threaded adaptor disposed between the threaded connection of the spin-on filter and the filter connection of said filter head.

10. The filtration system of claim 9 wherein said at least one threaded adaptor comprises a plurality of threaded adaptors having different configurations as compared to one another, whereby an appropriate one of the plurality of threaded adaptors is selectable depending upon a configuration of the threaded connection of the spin-on filter such that a plurality of spin-on filters having different configurations as compared to one another are compatible with said filter head.

11. The filtration system of claim 1 further comprising a pressure gauge displaying a pressure of the fluid within the filtration circuit.

12. The filtration system of claim 1 further comprising a sample spigot by which a sample of the fluid within the filtration circuit can be withdrawn.

13. The filtration system of claim 1 further comprising a detachable mounting bracket by which said filtration system is mountable to a surface.

14. The filtration system of claim 1 further comprising a detachable stand by which by which said filtration system is supported on a surface.

15. The filtration system of claim 1 wherein the direct current motor is equipped with at least one of the following: over speed protection, under speed protection, stall protection and thermal protection.

16. The filtration system of claim 1 wherein said variable speed pump has an adjustable pressure relief threshold, and wherein, if said pressure relief threshold is exceeded, a portion of the fluid to be filtered recirculates back through said variable speed pump to avoid over-pressurization of the filtration circuit.

17. A filtration system comprising:

a variable speed pump having a direct current motor and comprising an input adapted to communicate with a source of fluid to be filtered, wherein the direct current motor comprises a brushless motor and wherein said variable speed pump is magnetically driven by the direct current motor, whereby no driveshaft or transmission is employed;

a filter assembly having an input in communication with an output of said variable speed pump and an output in communication with the source of fluid;

wherein the source of fluid, said variable speed pump and said filter assembly define a kidney-loop filtration circuit in which the fluid is circulated and filtered, wherein the fluid to be filtered is an industrial or mobile fluid comprising at least one of a hydraulic fluid, a lubricating fluid and a liquid fuel and wherein said filter assembly reduces at least one of particle contamination and water from the fluid to be filtered;

a filter head on which said variable speed pump is mounted, said filter head having an inlet port in communication with said variable speed pump, a filter connection adapted to receive said filter assembly and an outlet port in communication with the source of fluid, wherein said filter assembly comprises a spin-on filter having a threaded connection adapted to engage the filter connection;

at least one threaded adaptor disposed between the threaded connection of the spin-on filter and the filter connection of said filter head; and a control circuit in communication with a direct current power supply and with the direct current motor of said variable speed pump, said control circuit varying a voltage received from the direct current power supply and supplying the varied voltage to the direct current motor such that the speed of the direct current motor is variable and consequently the flow of fluid through said variable speed pump and through said filter assembly is variable.

18. The filtration system of claim 17 wherein said control circuit comprises a potentiometer manually actuable by an operator to vary the voltage supplied to the direct current motor.

19. The filtration system of claim 17 wherein said control circuit comprises:

at least one sensor configured to measure at least one of a flow rate through the filtration circuit, a level of contamination within the filtration circuit and a pressure within the filtration circuit; and a processor in communication with said at least one sensor, said processor configured to vary the voltage supplied to the direct current motor at least in part based upon a value measured by said at least one sensor.

20. The filtration system of claim 17 wherein said at least one threaded adaptor comprises a plurality of threaded adaptors having different configurations as compared to one another, whereby an appropriate one of the plurality of threaded adaptors is selectable depending upon a configuration of the threaded connection of the spin-on filter such that a plurality of spin-on filters having different configurations as compared to one another are compatible with said filter head.

21. The filtration system of claim 17 further comprising a pressure gauge displaying a pressure of the fluid within the filtration circuit.

22. The filtration system of claim 17 further comprising a sample spigot by which a sample of the fluid within the filtration circuit can be withdrawn.

23. The filtration system of claim 17 further comprising a detachable mounting bracket by which said filtration system is mountable to a surface.

24. The filtration system of claim 17 further comprising a detachable stand by which by which said filtration system is supported on a surface.

25. The filtration system of claim 17 wherein the direct current motor is equipped with at least one of the following: over speed protection, under speed protection, stall protection and thermal protection.

26. The filtration system of claim 17 wherein said variable speed pump has an adjustable pressure relief threshold, and wherein, if said pressure relief threshold is exceeded, a portion of the fluid to be filtered recirculates back through said variable speed pump to avoid over-pressurization of the filtration circuit.

\* \* \* \* \*